Nov. 3, 1942. G. A. PERKINS Re. 22,217
DICHLOROALKYL ETHER
Original Filed May 11, 1933
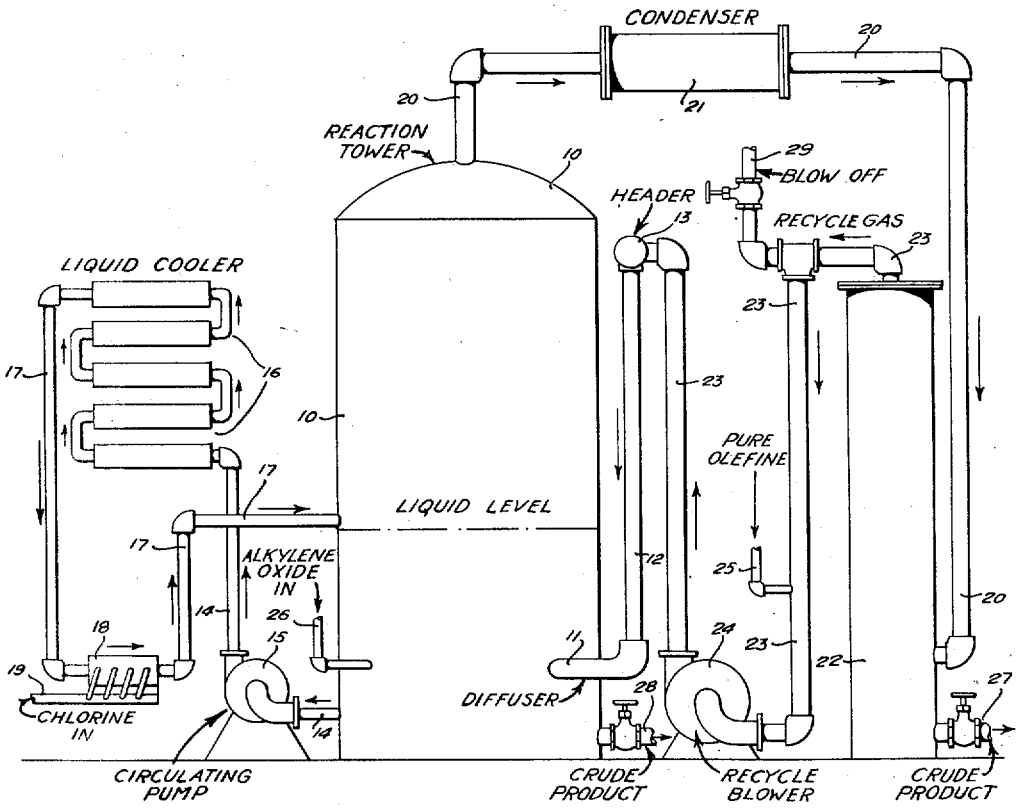
INVENTOR
GRANVILLE A. PERKINS
BY
Charles C. Scheffler
ATTORNEY Reissued Nov. 3, 1942 Re. 22,217

UNITED STATES PATENT OFFICE 22,217

DICHLOROALKYL ETHERS

Granville A. Perkins, Charleston, W. Va., assignor, by mesne assignments, to Carbide and Carbon Chemicals Corporation, a corporation of New York Original No. 2,042,862, dated June 2, 1936, Serial No. 670,538, May 11, 1933. Application for reissue January 29, 1938, Serial No. 187,720

18 Claims. (Cl. 260—614)

This invention is concerned with the manufacture of dichloroalkyl ethers, and more specifically is directed to the preparation of bis-beta-chloroethyl ether (commonly known as dichlorethyl ether) and its homologues. These ethers may also be called beta-beta'-dichloro-alkyl ethers, and they have been styled ethers of the general formula, Cl-alkyl-O-alkyl-Cl A primary object of this invention is to provide an improved process for making dichloroalkyl ethers. Another object is to provide an improved process for making dichloroalkyl ethers by the action of chlorine and olefines on alkylene chlorhydrins or on certain materials which, in the processes to be described, may be substituted therefor, such as alkylene oxides or water. Another object is to provide an improved process for making dichlorethyl ether by the action of chlorine and ethylene on ethylene chlorhydrin, or on substances capable of reacting with chlorine and ethylene to form chlorethyl hypochlorite, such as ethylene oxide or water. Still another object is to produce new dichloroalkyl ethers.

The invention broadly resides in the discovery that dichloroalkyl ethers can be made by producing chloralkyl hypochlorites and reacting upon them with olefines. In actual practice the process is conducted to produce the dichloroalkyl ethers in good yields by treating alkylene chlorhydrins with chlorine and olefines. The reactions involved appear to be as follows, taking the formation of dichlorethyl ether for illustration:

$$\underset{\text{Ethylene chlorhydrin}}{ClCH_2CH_2OH} + \underset{\text{Chlorine}}{Cl_2} = \underset{\text{Chlorethyl hypochlorite}}{ClCH_2CH_2OCl} + \underset{\text{Hydrochloric acid}}{HC}$$

$$\underset{\text{Chlorethyl hypochlorite}}{ClCH_2CH_2OCl} + \underset{\text{Ethylene}}{C_2H_4} = \underset{\text{Dichlorethyl ether}}{ClCH_2CH_2OCH_2CH_2Cl}$$

The hydrochloric acid which is formed in the first step shown above may be utilized or removed. For example, it may be utilized by adding ethylene oxide with which it will react to form additional ethylene chlorhydrin, or it may be removed in the gas phase with the excess ethylene. The foregoing discussion is advanced merely by way of an explanation of the chemistry involved in my new process, and it is to be understood that the invention is in no wise restricted or limited by any theory herein advanced.

The process may be carried out in any suitable apparatus, and a preferred system for carrying out the new process is diagrammatically shown in the accompanying drawing.

The new process may be practiced in various ways, depending upon the particular ether desired and the available raw materials. In any case the actual reactants probably are a chlorhydrin, chlorine and an olefine, but the process may be arranged to use as the main raw materials: (*a*) the actual reactants; (*b*) an alkylene oxide, chlorine and an olefine; (*c*) water, chlorine and an olefine; or (*d*) water, an alkylene oxide, chlorine and an olefine. In case (*a*), hydrochloric acid is a by-product. In case (*b*), the chlorhydrin is continually regenerated by the combination of hydrochloric acid and the alkylene oxide. In case (*c*), the chlorhydrin is continually formed from the water and a part of the chlorine and the olefine (that is, by reaction of the olefine with the aqueous hypochlorous acid solution formed from some of the water and chlorine). In case (*d*), which is my preferred method, some chlorhydrin is formed as in case (*c*) and some as in case (*b*). The details of operation in practicing my invention will be shown by the following examples:

*Example 1*

A glass cylinder 2 inches in diameter and 3 feet long was used as the reaction vessel. 839 grams of 99.5% ethylene chlorhydrin were placed in the cylinder, and ethylene and chlorine were bubbled therethrough for a period of 16 hours with the ethylene always in excess of the chlorine. The ethylene was introduced into the cylinder through a diffuser of porous silica. During the reaction the temperature of the liquid rose to about 80° C., and the hydrochloric acid which was formed remained in part in the liquid and in part was removed with the exit gases. An excess of water was finally added to the reaction liquid, and the constituents thereof were separated by fractional distillation. 366 grams of bis-beta-chloroethyl ether were obtained, a yield of 24.5% based on the total amount of ethylene chlorhydrin in the starting materials. 598 grams of ethylene chlorhydrin were recovered unchanged, hence the yield of dichlorethyl ether was 85.4% based on the chlorhydrin consumed in the reaction. The amount of ethylene dichloride formed as a byproduct was about equal to that of the dichlorethyl ether.

*Example 2*

Ethylene chlorhydrin was treated as in Example 1 except that propylene was used instead of ethylene. The ether produced by this reaction was found to be a new product. It was identified as beta-chloroethyl-beta-chloroisopropyl ether, boiling at 65° C. at 8 mm., and having probably the structural formula $$ClCH_2-CH_2-O-\underset{\underset{CH_3}{|}}{CH}-CH_2Cl$$

*Example 3*

The reaction between anhydrous ethylene chlorhydrin, chlorine and ethylene was started as in Example 1, but as soon as the reaction mixture became distinctly acid to methyl orange, ethylene oxide vapor was added continuously. The proportion of ethylene oxide to chlorine was adjusted so as to permit the reaction mixture to remain slightly acid. Portions of the reaction mixture were removed from time to time, neutralized with ethylene oxide, and fractionally distilled to separate the constituents. The ethylene chlorhydrin thus recovered was returned to the reaction mixture, and was found to be practically sufficient, with but slight augmentation by fresh ethylene chlorhydrin, to keep the process running continuously. A smaller propertion of ethylene dichloride was formed than in Example 1, probably because the lower concentration of hydrochloric acid favored the formation of chlorethyl hypochlorite.

The ethylene oxide may be added at such a rate as to keep an excess of ethylene oxide always present. Due to the close relationship between ethylene chlorhydrin and ethylene oxide it would be expected that the chlorine will react directly with ethylene oxide as well as with ethylene chlorhydrin, forming in both cases chlorethyl hypochlorite. In fact, I have found that chlorine will react with pure or diluted ethylene oxide to form an unstable product with a sharp odor which will react with ethylene to form dichlorethyl ether, this product being probably chlorethyl hypochlorite. The direct reaction of chlorine with undiluted ethylene oxide is entirely unsuitable for commercial purposes, since a violent detonation may occur instead of the expected reaction. The direct combination of chlorine with diluted ethylene oxide is not dangerous, but is undesirable for other reasons: thus, in aqueous media ethylene oxide is lost by the formation of ethylene glycol and polyglycols, and in non-aqueous media, condensation products of ethylene oxide are formed.

For these reasons, it is desirable to permit the reaction medium to remain slightly acid. Under such conditions the hydrochloric acid most probably will react with ethylene oxide which is added to form ethylene chlorhydrin for consumption in the process. Also, under conditions in which very little free acid is present, good yields of the desired product are obtained. Therefore, it is impossible to state whether in any event the direct reaction of ethylene oxide and chlorine is of importance in the process.

*Example 4*

A reaction mixture containing about 30% of ethylene chlorhydrin, 50% of dichlorethyl ether, 10% of ethylene dichloride, and 10% of water was treated with chlorine and an excess of ethylene, both introduced through diffusers. The temperature of the reaction was maintained at about 50° C. The hydrochloric acid which formed passed off with the excess ethylene, leaving less than 1% in the reaction mixture. Dichlorethyl ether was formed in good yield, and it was found unnecessary to return any chlorhydrin to the reaction. Water was added occasionally to replenish that which was consumed or evaporated, and part of the ethylene reacted with the aqueous hypochlorous acid resulting from the combination of chlorine with water to form the chlorhydrin which was utilized in the process.

*Example 5*

The preferred system shown diagrammatically in the drawing was employed in this embodiment of the invention. Water was placed in a reaction tower 10 which was lined with acid-proof brick, and ethylene was bubbled into the water by means of a ceramic diffuser 11 placed near the bottom of the tower 10 and supplied with gas by a pipe 12 connected to a header 13. The liquid contents of the tower 10 were continuously circulated by a line 14 and a pump 15 through a cooler 16 returning to the tower 10 by a line 17. Chlorine was introduced into this circulating liquid in fine bubbles by means of a diffuser 18 placed in the line 17 and supplied with chlorine by a line 19. Gases were removed from the tower 10 by a line 20 and a condenser 21 was placed in the line 20 to condense ethylene dichloride and other volatile products in the gases. The line 20 was connected to a tower 22 from the top of which a line 23 was connected to a compressor 24 by means of which any portion of the exit gases from the tower 10 could be recirculated along with fresh ethylene supplied to the line 23 by a line 25. A blow off line 29 permits the gases, or portions thereof, from the tower 22 to be removed from the system.

Ethylene oxide was supplied to the tower 10 by a line 26 placed at a point not close to the chlorine inlet at such a rate as to keep the contents of the tower slightly acid.

The water, chlorine and ethylene reacted in the tower 10 to form ethylene chlorhydrin and hydrochloric acid, which latter reacted with the ethylene oxide forming further qualities of ethylene chlorhydrin. Some of the ethylene and chlorine also reacted forming ethylene dichloride. As the chlorhydrin concentration increased in the liquid, dichlorethyl ether was formed in increasing quantities. The ether and some of the ethylene dichloride accumulated in the tower 10 until they composed nearly half of the liquid contents the amount of water being reduced to about 15%, and the balance being composed mostly of ethylene chlorhydrin. A small amount of dissolved ethylene was present but the chlorine and ethylene oxide reacted so rapidly that neither of these reagents were present in high concentrations in the reaction mixture. Water was then added occasionally to prevent the depletion of the chlorhydrin content.

The crude product consisted of the condensate from the exit gases which was removed from the bottom of tower 22 by a line 27, and portions drawn off occasionally from the reaction tower 10 by a line 28. It was found to be advantageous in treating the product to combine the crude products, add a little water to this combined product, separate the two layers which form, and return to the reaction liquid the upper layer which contained most of the removed chlorhydrin and very little ether. This procedure assisted in maintaining a high concentration of chlorhydrin in the reaction liquid in the tower 10.

The lower layer separated from the product contained the dichlorethyl ether, ethylene dichloride, some ethylene chlorhydrin, and water. A portion of this chlorhydrin was removed by washing with water, and the remaining constituents in the mixture were separated by fractional distillation. Final purification of the dichlorethyl ether was effected by distillation under reduced pressure.

*Example 6*

Dichlorisopropyl ether (bis-beta-chloroisopropyl ether) was made by a procedure exactly analogous to that of Example 5, in which propylene and propylene oxide were substituted for the ethylene and ethylene oxide.

If it is desired to form a large proportion of the by-product, the alkylene dichloride (ethylene or propylene dichloride), the chlorhydrin and water concentrations may be allowed to become low. However, for the best yields of the dichloroalkyl ethers, the concentration of chlorhydrin in the reaction should be maintained at about 40% and the water concentration should be kept high enough (usually about 15%) to maintain the desired concentration of chlorhydrin.

It will be seen that the operation of the process in its preferred form involves the reaction of the olefine with aqueous hypochlorous acid formed from water and chlorine to yield the chlorhydrin consumed in the formation of the desired dichloroalkyl ethers. It is necessary, however, to have present in the reacting mixture a substantial quantity of the chlorhydrin.

The presence of hydrochloric acid represses the reactions which yield the desired ethers, and therefore favors the by-product formation of dichlorides. On the other hand, too great reduction of acid content favors the formation of glycols and alkylene oxide condensation products. An acidity of about 1% may be advantageously maintained if the water concentration is high, that is above about 15%, and an acidity of 0.1% or less is desirable if the water concentration is low. In this connection, the acidity is determined with respect to methyl orange as an indicator. A convenient temperature at which to conduct the reaction is about 30° C. At this temperature 4,000 gallons of reaction mixture can readily absorb 500 pounds of chlorine and the equivalent amount of ethylene per hour. The reactions of the process are reasonably rapid at lower temperatures, for instance, at 20° C., and can be carried out successfully at temperatures as high as 100° C.

I claim:

1. Process for making dichloroalkyl ethers which comprises treating substantially anhydrous alkylene chlorhydrins with chlorine and olefines.

2. Process for making dichloroalkyl ethers which comprises treating substantially anhydrous ethylene chlorhydrin with chlorine and an olefine.

3. Process for making dichlorethyl ether which comprises treating substantially anhydrous ethylene chlorhydrin with chlorine and ethylene.

4. Process for making dichloroalkyl ethers which comprises treating substantially anhydrous ethylene chlorhydrin with chlorine and propylene.

5. Process for making dichloroalkyl ethers which comprises treating aqueous alkylene chlorhydrins with chlorine and olefines, the amount of chlorhydrins present being greater than the amount of water.

6. Process for making dichloroethyl ether which comprises treating aqueous ethylene chlorhydrin with chlorine and ethylene, the amount of chlorhydrin present being greater than the amount of water.

7. Process for making dichloropropyl ether which comprises treating aqueous propylene chlorhydrin with chlorine and propylene, the amount of chlorhydrin present being greater than the amount of water.

8. Process for making dichloroalkyl ethers which comprises reacting alkylene oxides with chlorine and olefines.

9. Process for making dichloroalkyl ethers which comprises reacting ethylene oxide with chlorine and olefines.

10. Process for making dichlorethyl ether which comprises reacting ethylene oxide with chlorine and ethylene.

11. As a chemical product, beta-chloroethyl-beta-chloroisopropyl ether, having a boiling point of about 65° C. at 8 mm., and having the structural formula $$ClCH_2-CH_2-O-\underset{\underset{CH_3}{|}}{CH}-CH_2Cl$$

12. Process for making dichloroalkyl ethers which comprises reacting an olefine and chlorine with an aqueous mixture which is composed of about 30% of the chlorhydrin of said olefine as a minimum.

13. Process for making bis-beta-chloroethyl ether which comprises passing ethylene and chlorine into an aqueous mixture containing about 30% ethylene chlorhydrin as a minimum.

14. Process for making dichloroalkyl ethers which comprises passing an olefine and chlorine into water until the reacting mixture contains about 30% of the chlorhydrin of said olefine, and thereafter continuing to react on said aqueous mixture with chlorine and an olefine.

15. Process for making dichloroalkyl ethers which comprises passing an olefine and chlorine into water until the reaction mixture contains the chlorhydrin of said olefine in an amount greater than the amount of water present, and thereafter continuing to react on said mixture with chlorine and the olefine.

16. Process for making bis-beta-chloroethyl ether which comprises passing ethylene and chlorine into water until the reaction mixture contains about 30% ethylene chlorhydrin as a minimum, and thereafter continuing to react on said mixture with ethylene and chlorine.

17. Process for making bis-beta-chloroisopropyl ether which comprises passing propylene and chlorine into water until the reaction mixture contains about 30% propylene chlorhydrin as a minimum, and thereafter continuing to react on said mixture with propylene and chlorine.

18. In a method of making a beta-beta'-dichloroalkyl ether having the general formula Cl—alkyl—O—alkyl—Cl wherein the two alkyl groups are identical and each contains more than two carbon atoms, the steps which consist in simultaneously passing chlorine and a normal olefine containing more than two carbon atoms into water while stirring the latter until the resulting solution contains about 30% of the chlorhydrin of said olefine as a minimum, the hydrogen chloride generated by the treatment remaining largely dissolved in the reacting mixture and thereafter separating the beta-beta'-dichloro-alkyl ether product.

GRANVILLE A. PERKINS.